US012519195B2

(12) United States Patent
Park et al.

(10) Patent No.: US 12,519,195 B2
(45) Date of Patent: Jan. 6, 2026

(54) CERAMIC WAVEGUIDE FILTER FOR ANTENNA

(71) Applicant: KMW INC., Hwaseong-si (KR)

(72) Inventors: Nam Shin Park, Hwaseong-si (KR); Jae Hong Kim, Yongin-si (KR); Jong Hyeok Park, Osan-si (KR); Yeon Ho Shin, Yongin-si (KR); Hoon Kim, Osan-si (KR)

(73) Assignee: KMW INC., Hwaseong-si (KR)

( * ) Notice: Subject to any disclaimer, the term of this patent is extended or adjusted under 35 U.S.C. 154(b) by 215 days.

(21) Appl. No.: 18/138,079

(22) Filed: Apr. 23, 2023

(65) Prior Publication Data

US 2023/0261353 A1 Aug. 17, 2023

Related U.S. Application Data

(63) Continuation of application No. PCT/KR2021/015167, filed on Oct. 27, 2021.

(30) Foreign Application Priority Data

Oct. 29, 2020 (KR) ........................ 10-2020-0141822
Oct. 26, 2021 (KR) ........................ 10-2021-0143606

(51) Int. Cl.
*H01P 1/20* (2006.01)
*H01P 1/208* (2006.01)
*H01Q 9/04* (2006.01)

(52) U.S. Cl.
CPC .......... *H01P 1/2002* (2013.01); *H01P 1/2088* (2013.01); *H01Q 9/0485* (2013.01)

(58) Field of Classification Search
CPC .......... H01P 1/2002; H01P 1/20; H01P 1/201; H01P 1/202; H01P 1/205; H01P 1/2053;
(Continued)

(56) References Cited

U.S. PATENT DOCUMENTS

2017/0365902 A1 12/2017 Ashida et al.

FOREIGN PATENT DOCUMENTS

CN 111342187 A 6/2020
JP H03-212003 A 9/1991
(Continued)

OTHER PUBLICATIONS

Japanese Office Action mailed on Jun. 25, 2024 from the Japanese Patent Office for Japanese Application No. 2023-525016.
(Continued)

*Primary Examiner* — Stephen E. Jones
(74) *Attorney, Agent, or Firm* — Insight Law Group, PLLC; Seung Lee

(57) ABSTRACT

The present disclosure relates to a ceramic waveguide filter for an antenna, which, in particular, includes a housing including a plurality of resonance blocks which are prepared from a dielectric having a predetermined dielectric constant, and some of which are partitioned by an inner partition wall; a plurality of resonators, each resonator being caused to serve as a single resonator by a plurality of resonator posts respectively provided in the plurality of resonance blocks included in the housing; and an input porthole to which an input port is connected to input a signal to any one of the plurality of resonators, and an output porthole to which an output port is connected to output a signal from any one of the plurality of resonators, Since either the input porthole or the output porthole is provided with a notch structure bar integrally formed in the housing, which extends towards the resonator post skipping from the adjacent resonator post among the plurality of resonator posts, advantageously the notch design of the passband can be performed with easy.

6 Claims, 12 Drawing Sheets

(a)

(b)

(58) Field of Classification Search
CPC ........ H01P 1/2056; H01P 1/207; H01P 1/208; H01P 1/2088
See application file for complete search history.

(56) References Cited

FOREIGN PATENT DOCUMENTS

| | | | | |
|---|---|---|---|---|
| JP | H05-145302 | A | | 6/1993 |
| JP | 2004032638 | A | * | 1/2004 |
| JP | 2004-289352 | A | | 10/2004 |
| JP | 2008-098727 | A | | 4/2008 |
| KR | 10-2011-0097723 | A | | 8/2011 |
| KR | 10-2018-0134830 | A | | 12/2018 |
| KR | 10-2019-0082328 | A | | 7/2019 |
| KR | 10-2020-0086219 | A | | 7/2020 |

OTHER PUBLICATIONS

European Search Report for Application No. 21886786.9-1201 dated Aug. 22, 2024.
International Search Report mailed Jan. 25, 2022 for International Application No. PCT/KR2021/015167 and its English translation.

* cited by examiner (a)

(b)

(a)

(b)

CERAMIC WAVEGUIDE FILTER FOR ANTENNA

CROSS-REFERENCE TO RELATED APPLICATIONS

This application is a continuation application of International Application No. PCT/KR2021/015167, filed Oct. 27, 2021, which claims the benefit of Korean Patent Application Nos. 10-2020-0141822, filed Oct. 29, 2020; and 10-2021-0143606, filed Oct. 26, 2021, in the Korean Intellectual Property Office, the disclosures of which are incorporated herein in their entirety by reference.

TECHNICAL FIELD

The present disclosure relates to a ceramic waveguide filter for an antenna, and more particularly, to a ceramic waveguide filter for an antenna prepared such that cross coupling can be implemented between one of an input porthole and an output porthole to which an input port and an output port are connected respectively and an adjacent resonator.

BACKGROUND ART

Recently, as the number of kinds of wireless communication services increases, the frequency environment is becoming more complicated. Since frequencies for wireless communication are limited, there is a need to effectively utilize frequency resources by allocating wireless communication channels as close to each other as possible.

However, since signal interference occurs in an environment where various wireless communication services are provided, the antenna includes a band pass filter for a specific band in order to minimize signal interference between neighboring frequency resources.

In general, it is essential to apply a transmission zero (hereinafter, referred to as "notch") to improve the attenuation characteristics of a band pass filter, and this is implemented by applying cross coupling to between non-adjacent resonant elements.

Among RF filters, a ceramic waveguide filter includes a resonator for adjusting a notch in a dielectric block covered with a conductive film. The resonator is designed to limit a specific frequency by imparting the resonant characteristics onto electromagnetic waves.

In this regard, if the cross coupling is performed across an even number of resonators, left-right symmetrical notches occur in the passband, and if the cross coupling is performed across an odd number of resonators, it is common that one notch occurs on the left or right side depending on the kind of the coupling.

It is necessary to implement the notches in these communication filters in various ways depending on the performances of the communication systems, but the performances of the communication filters are limited in terms of implementing a filter suitable for the characteristics of a communication system.

Accordingly, it is necessary to differently set filters according to communication systems so that notches can be implemented on the left or right side of a specific passband in an antenna.

However, the ceramic waveguide filter for an antenna according to the related art discloses only a structure for implementing the left or right notch through coupling between resonators, and its design is very complicated. Additionally, there is a problem in that it is difficult to design an effective coupling because it is difficult to insert an additional structure for implementing the cross coupling into the filter.

SUMMARY OF INVENTION

Technical Problem

The present disclosure has been conceived to address the aforementioned technical problems, and the objective of the present disclosure is to provide a ceramic waveguide filter for an antenna in which characteristics of a specific passband are enhanced by applying a structure capable of the cross coupling to any one of an input porthole and an output porthole to which an input port and an output port are connected, respectively.

Another objective of the present disclosure is to provide a ceramic waveguide filter for an antenna in which coupling design can be accomplished according to the requirements of the designer without inserting an additional structure for implementing the cross coupling into the filter.

The drawbacks which the present disclosure addresses are not limited to the aforementioned ones, but other drawbacks which can be solved by the present disclosure will become apparent to those skilled in the art from the description below.

Solution to Problem

The ceramic waveguide filter for an antenna according to an embodiment of the present disclosure configured as described above includes a housing including a plurality of resonance blocks which are prepared from a dielectric having a predetermined dielectric constant, and some of which are partitioned by an inner partition wall; a plurality of resonators, each resonator being caused to serve as a single resonator by a plurality of resonator posts respectively provided in the plurality of resonance blocks included in the housing; and an input porthole to which an input port is connected to input a signal to any one of the plurality of resonators, and an output porthole to which an output port is connected to output a signal from any one of the plurality of resonators, wherein either the input porthole or the output porthole is provided with a notch structure bar integrally formed in the housing, which extends towards a resonator post skipping from an adjacent resonator post among the plurality of resonator posts.

Here, the input porthole or the output porthole may be formed on another surface of the housing opposite to one surface on which the plurality of resonator posts are formed, and the notch structure bar may be formed to extend in a horizontal direction.

Also, the input porthole or the output porthole may be formed on another surface of the housing opposite to one surface on which the plurality of resonator posts are formed, and the notch structure bar may be formed to extend in a horizontal direction, and, in particular, formed to extend in the horizontal direction and horizontally parallel to the bottom surface of the resonator post.

Also, the notch structure bar may be formed through a cutting process in a groove shape on said another surface opposite to the one surface of the housing on which the plurality of resonator posts are formed, and the notch structure bar may be formed through a cutting process shallower than the depth of the input porthole or the output porthole.

Also, a notch partition groove may be further processed and formed from the front end of the notch structure bar to a depth greater than the depth of the input porthole or the output porthole.

Also, a portion between a resonator post formed on one surface of the housing associated with a resonance block corresponding to the input porthole or the output porthole with regard to which the notch structure bar is formed (hereinafter, referred to as "corresponding post") and a resonator post adjacent to the corresponding post (hereinafter, referred to as "adjacent post") may be partitioned by the inner partition wall and by an outer partition wall formed on a side wall of the housing.

Also, height of entire frequency may be compensated according to the depth of a resonator post formed on the one surface of the housing associated with a resonance block corresponding to the input porthole or the output porthole (hereinafter, referred to as "corresponding post").

Also, when the depth of the corresponding post becomes relatively greater based on the depth of a resonator post adjacent to the corresponding post (hereinafter, referred to as "adjacent post"), complementation may be made so that the entire frequency is decreased by a depth difference between the corresponding post and the adjacent post.

Also, when the depth of the corresponding post becomes relatively smaller based on the depth of a resonator post adjacent to the corresponding post (hereinafter, referred to as "adjacent post"), complementation may be made so that the entire frequency is increased by a depth difference between the corresponding post and the adjacent post.

Also, the kinds of notches implemented on the left or right side of a passband may be different during frequency filtering depending on whether the notch partition groove is present or not.

Also, on the notch structure bar and the input porthole or the output porthole, coating portions may be formed by coating a metal material through plating.

Also, the notch structure bar may be partitioned by a non-plated portion in order to prevent an electrical short between the input porthole or the output porthole and a coating portion coated on the outer surface of the housing through plating.

Also, the housing may be provided with a partition wall which partitions a resonance block (hereinafter, referred to as "first resonance block") having the adjacent resonator post (hereinafter, referred to as "first resonator post") among the plurality of resonator posts and a resonance block (hereinafter, referred to as "second resonance block") provided with the resonator post (hereinafter, referred to as "second resonator post"), which skips from the first resonator post, from each other, and the notch structure bar and the front end of the notch partition groove may extend toward the second resonator post farther than the partition wall.

Advantageous Effects

According to the ceramic waveguide filter for an antenna according to the present disclosure, since the cross coupling can be implemented through the notch partition groove and the notch structure bar extending from either the input porthole or the output porthole, it is possible to obtain an effect of facilitating easy resonance design inside the housing.

LIST OF REFERENCE SIGNS

Figure 1:
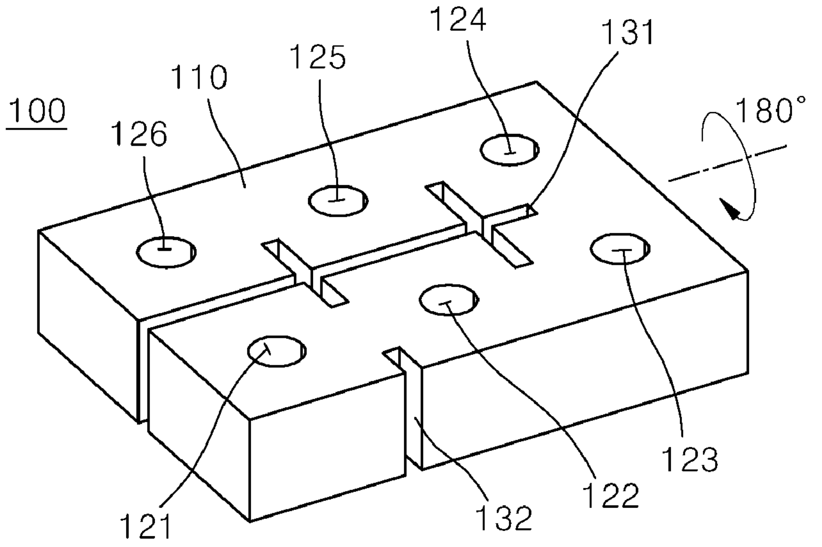
FIG. 1 is a perspective view showing a ceramic waveguide filter for an antenna according to the present disclosure.

100, 100*a*, 100*b*: Ceramic waveguide filter 110*a*, 110*b*: Housing
121 to 126: Resonator posts 131: Inner partition wall
132: Outer partition wall 141: Input porthole
141*a*: Notch structure bar 141*b*: Notch partition groove
142: Output porthole

DESCRIPTION OF EMBODIMENTS

Advantages and characteristics of the disclosure, and methods of achieving them will become apparent with reference to the embodiments described below in detail in conjunction with the accompanying drawings. However, the present disclosure is not limited to the embodiments disclosed below, but will be implemented in a variety of different forms, and the present embodiments are only provided so that the description of the present disclosure is complete, and to fully inform those of ordinary skill in the art to which the present disclosure pertains of the scope of the disclosure, and the disclosure is defined only by the scope of the claims. Like reference numerals refer to like components throughout the specification.

Hereinafter, embodiments of the disclosure will be described concretely with reference to the accompanying drawings.

Figure 2:
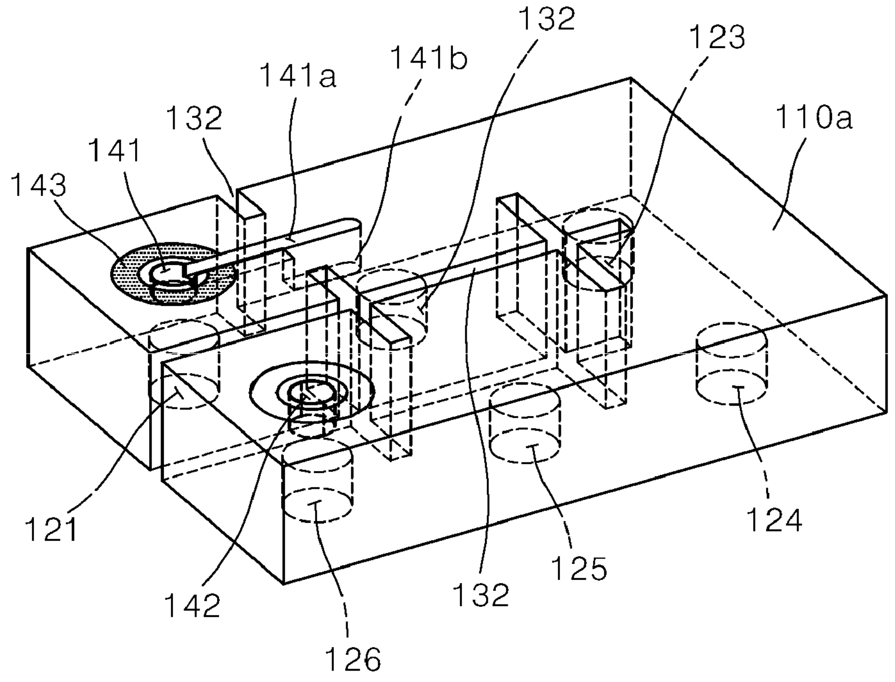
FIG. 2 is a projected perspective view of various embodiments showing the other surface of the housing of the configuration shown in FIG. 1 on which a notch structure bar or a notch partition groove is formed.
Figure 2:
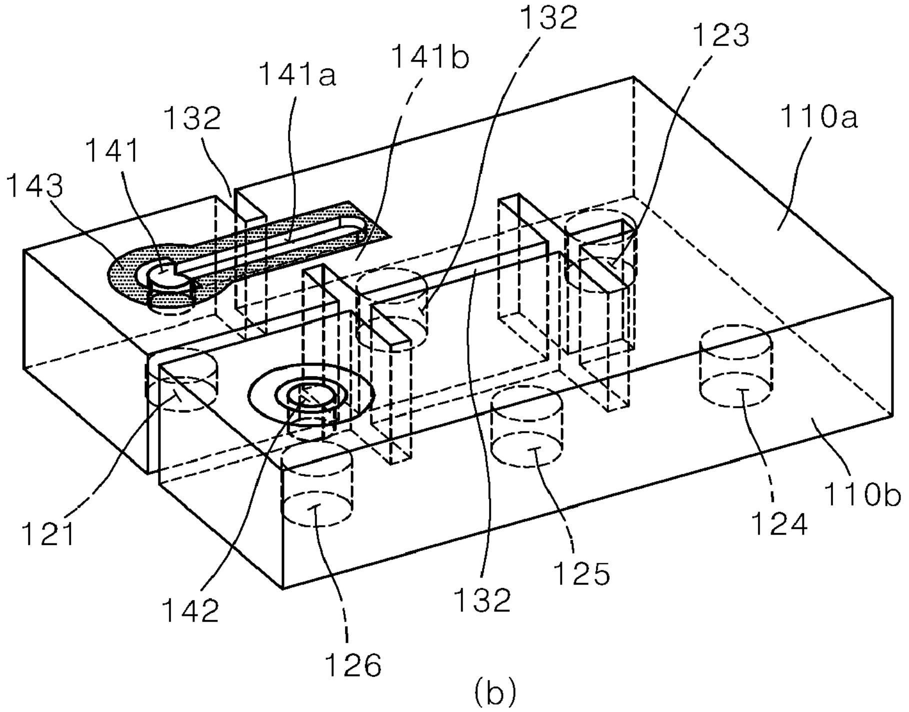

FIG. 1 is a perspective view showing a ceramic waveguide filter for an antenna according to the present disclosure, and FIG. 2 is a projected perspective view of various embodiments showing the other surface of the housing of the configuration shown in FIG. 1 on which a notch structure bar or a notch partition groove is formed.

The communication antenna includes a filter for filtering a signal of a specific passband. A cavity filter, a waveguide filter, or the like may be used as the filter depending on the characteristics, but in the embodiment of the present disclosure, a ceramic waveguide filter 100 using a ceramic material-based dielectric among waveguide filters which may be provided to the antenna will be primarily described.

Referring to FIG. 1, the ceramic waveguide filter 100 for an antenna according to the present disclosure includes a plurality of resonance blocks (no reference number is designated to them).

In general, the ceramic waveguide filter 100 includes at least 4 or more resonance blocks, and, for example, 4 to 20 resonance blocks may be provided in a housing 110 constituting one filter. As shown in FIG. 1, the ceramic waveguide filter 100 for an antenna according to the present disclosure will be described by way of example as including six resonance blocks, each of which is provided with corresponding one of the resonator posts 121 to 126.

In the ceramic waveguide filter 100 for an antenna according to the present disclosure, the six resonance blocks may be formed within one housing 110 prepared from ceramic material-based dielectric, and some of them may be partitioned off from each other by an inner partition wall 131 or an outer partition wall 132 to be described below.

The inside of each resonance block is filled with a dielectric material, and ceramic or air may be used as the dielectric material, although other dielectric materials may also be used. It should be noted that the ceramic waveguide filter 100 for an antenna according to the present disclosure will be described under the assumption that the dielectric material is a ceramic material.

Additionally, on the entire outer surface of one (i.e., single) housing 110, a coating portion may be formed by coating a metal material through plating. That is, the ceramic waveguide filter 100 may perform filtering in a state where electrical signal transmission to the inside and outside of the housing 110 is completely blocked by the coating portion on the entire outer surface except for the input porthole 141 or the output porthole 142 to be described below, and the signals passing through the input porthole 141 and the output porthole 142 inside the housing 110 are shielded from external signals by the coating portion.

Each of the plurality of resonance blocks operates as one resonator, so that the ceramic waveguide filter 100 constituted with six resonators can be formed through the six resonance blocks.

Meanwhile, each resonance block may be provided with one of the resonator posts 121 to 126. The resonator posts 121 to 126 can also be provided in a form in which a dielectric having a different dielectric constant from that of the ceramic material forming the resonance block is inserted. In general, since air is a kind of dielectric having a certain dielectric constant, air can also be a material constituting the resonator posts 121 to 126, and when assuming that the resonator posts 121 to 126 have the dielectric constant of air, each of the resonator posts 121 to 126 may be formed in the form of an empty space which has been generated by removing a part of each resonance block.

Hereinafter, for convenience of explanation, it will be assumed that each of the resonator posts 121 to 126 is provided in the form of a hollow with a dielectric of a dielectric constant of air inserted thereinto. For the inner partition wall 131 and the outer partition wall 132 to be described below, a similar interpretation may be possible.

If each of the resonator posts 121 to 126 is air, this means that they are provided to the housing 110 in the form of empty spaces therein by cutting away or removing the corresponding portions of the housing 110, and if each of the resonator posts 121 to 126 is prepared from a dielectric having a predetermined dielectric constant, this means that they are provided to the housing 110 in the form of the shapes of the resonator posts 121 to 126 being inserted into the inside of the housing.

The resonator posts 121 to 126 may be provided on one surface (top surface) or the other surface (bottom surface) of the housing 110 constituting the respective resonance blocks. In this connection, the exact meaning of the resonator posts 121 to 126 being provided on the one surface or the other surface of the housing 110 may be defined as the resonator posts 121 to 126 being provided inside the housing 110 so that their outer surfaces match the outer surface (one surface or the other surface) of the housing 110.

Meanwhile, when the first resonator post 121 is installed on the one surface (top surface) of the first resonance block, the other resonator posts 122 to 126 may also be installed on the one surfaces (top surfaces) of the respective resonance blocks. That is, the outer surfaces of all the resonator posts 121 to 126 may be provided to match the one surface (top surface) of the housing 110.

When each of the resonator posts 121 to 126 is constituted with air having a predetermined dielectric constant, being installed on the one surface (top surface) or the other surface (bottom surface) of the housing 110 means that respective openings are formed to open toward the one surface (top surface) or the other surface (bottom surface) of the housing 110.

The first to sixth resonance blocks are combined with the first to sixth resonator posts 121 to 126 to operate as independent resonators, respectively. Accordingly, a total six of first to sixth resonators may be formed in one housing 110.

The inner partition wall 131 or the outer partition wall 132 may be formed between the respective resonance blocks, and the size and resonance characteristics of the respective resonance blocks may be varied according to the sizes (width, length) and locations of the respective partition walls 131, 132.

In the ceramic waveguide filter 100 for an antenna according to the present disclosure, as shown in FIGS. 1 and 2, the inner partition wall 131 and the outer partition wall 132 may be included as a partition wall.

For example, when it is assumed that the shape of the housing 110 is formed in a hexahedron shape having a rectangular cross-section formed long in the longitudinal direction, the inner partition wall 131 may be formed as a cutaway portion from the middle portion of one end in the longitudinal direction to a proximity of the middle portion of the other end in the longitudinal direction, and may be formed to have a '+' shape by extending a predetermined length orthogonally in the width direction at at least two locations.

The outer partition wall 132 may be formed as a cutaway portion having a predetermined depth inward from the one side end of the housing 110, in particular, so that it may partition the resonance blocks provided with the first resonator post 121 in which a notch structure bar 141*a* to be described below is formed and the second resonator post 122 from each other.

Here, as described above, a portion between the resonator post formed in the resonance block corresponding to the input porthole 141 or the output porthole 142 with regard to which the notch structure bar 141*a* to be described below is formed (e.g., the first resonator post 121, hereinafter referred to as "corresponding post") and the resonator post adjacent to the corresponding post 121 (e.g., the second resonator post 122, hereinafter referred to as "adjacent post") may be partitioned by the inner partition wall 131, and another portion therebetween may be partitioned by the outer partition wall 132 formed on the side wall of the housing 110.

More specifically, for example, assuming that a total six of resonance blocks are provided, the inner partition wall 131 may be a structure that is wholly involved in physically partitioning the respective resonance blocks, while the outer partition wall 132 may be a structure involved only in partitioning the resonance blocks for cross coupling in order to implement C-coupling or L-coupling, which will be described below.

Figure 3:
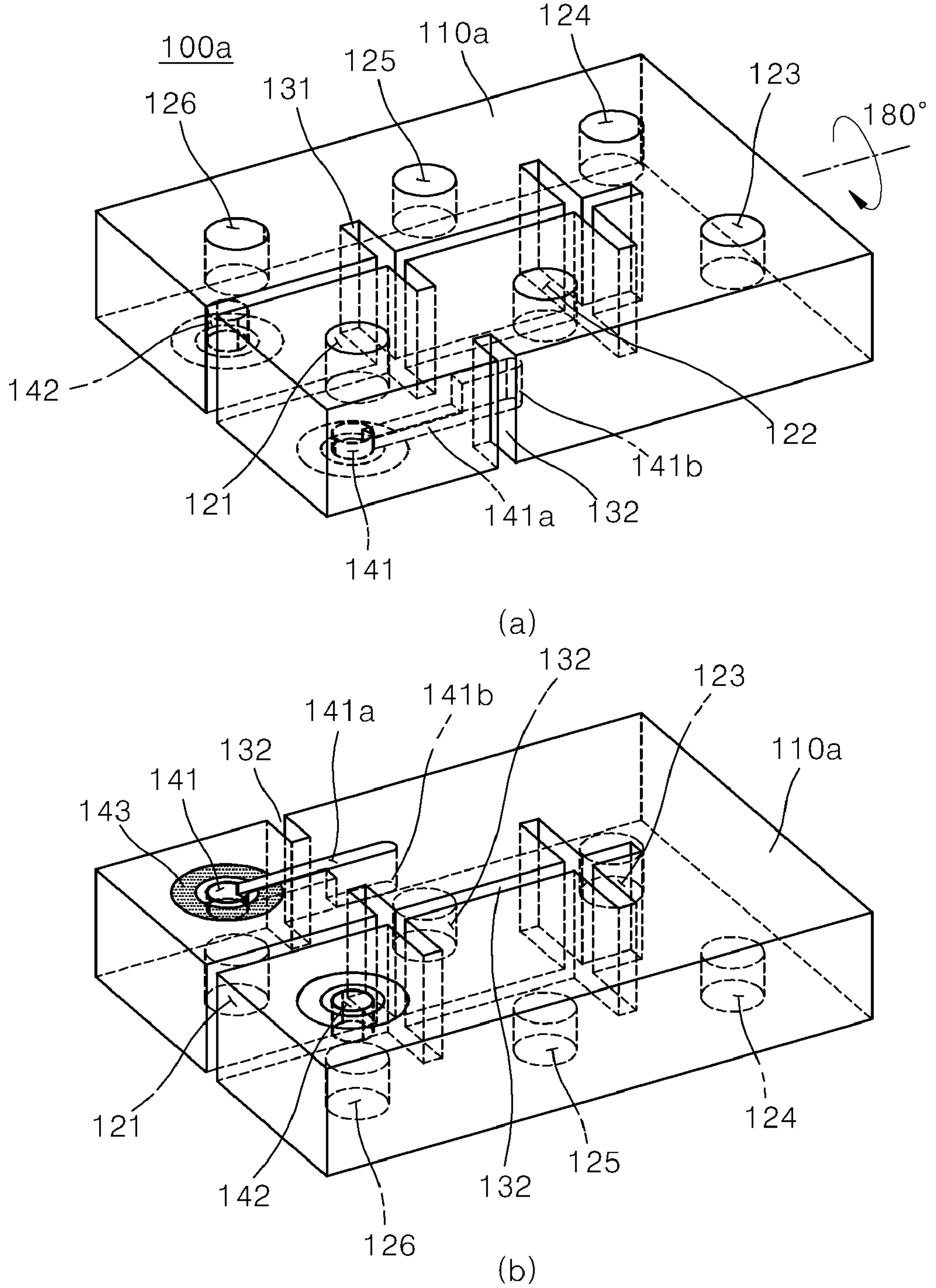
FIG. 3 is a projected perspective view showing the top and bottom surfaces of a ceramic waveguide filter for an antenna according to an embodiment of the present disclosure.
Figure 4:
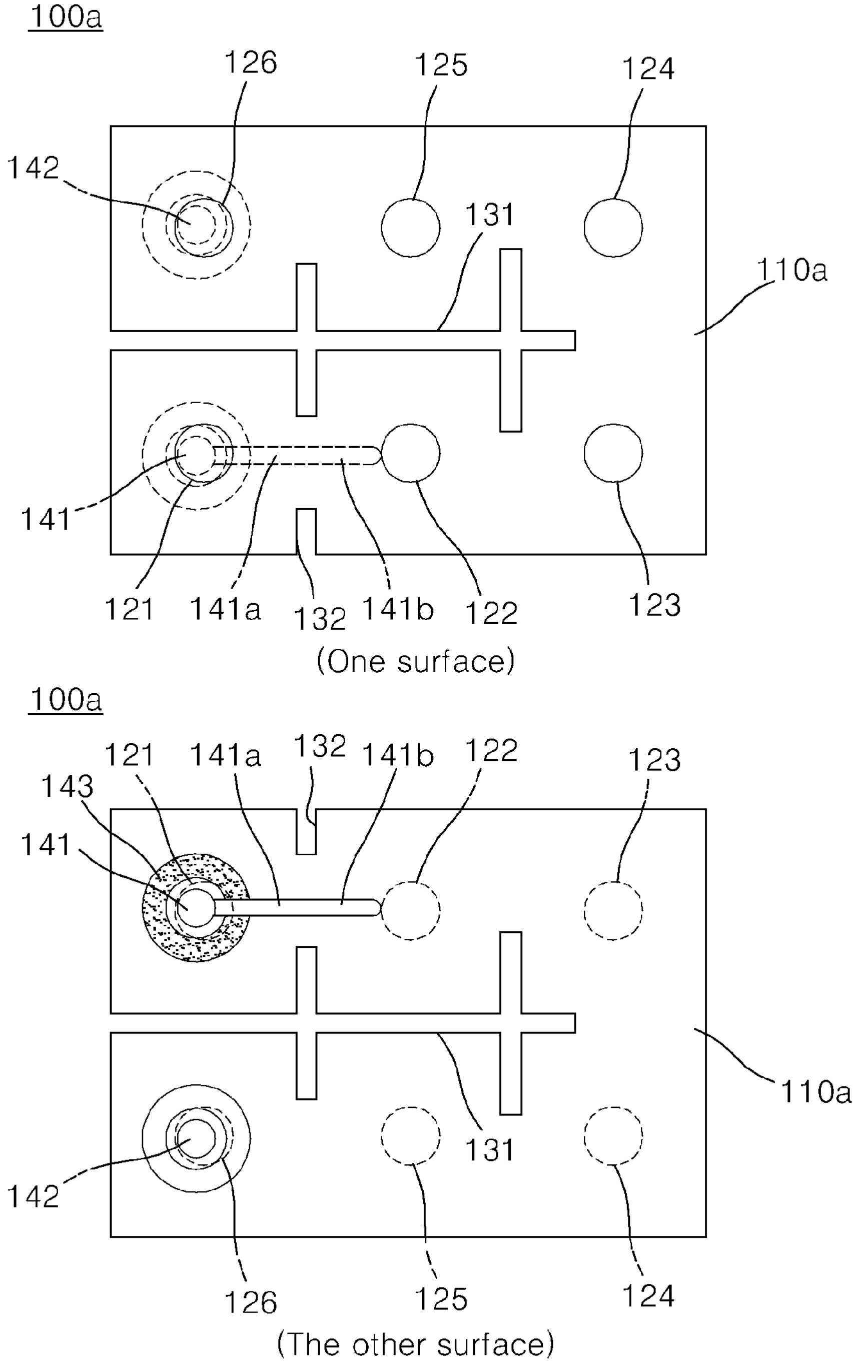
FIG. 4 is a projected plan view showing the one surface and the other surface of the housing of FIG. 3.
Figure 5:
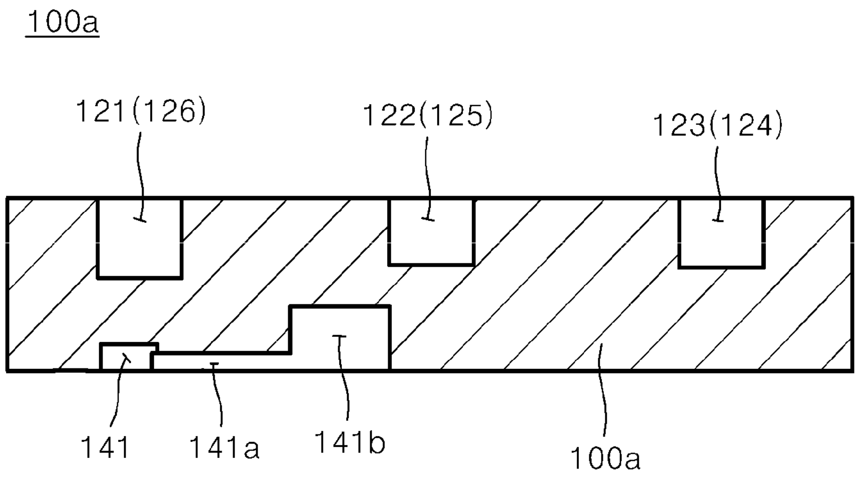
FIG. 5 is a cross-sectional view showing the notch structure bar of the configuration shown in FIG. 3.
Figure 6:
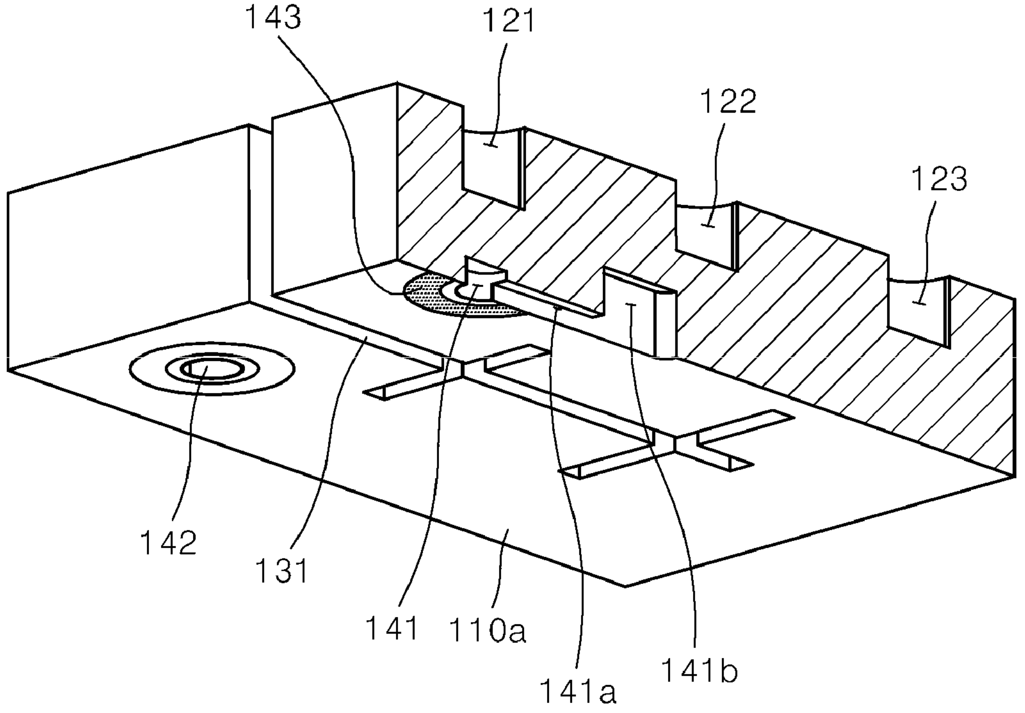
FIG. 6 is a perspective view of FIG. 5.
Figure 7:
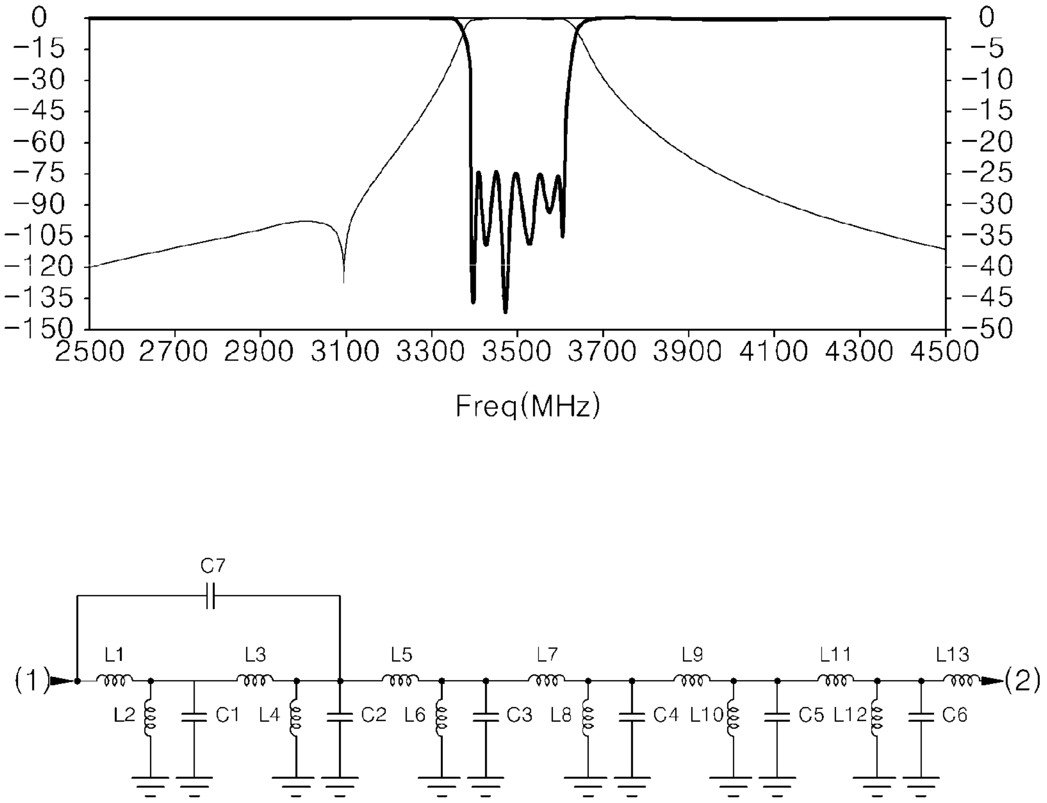
FIG. 7 shows a graph representing the frequency characteristics of a ceramic waveguide filter for an antenna according to an embodiment of the present disclosure, and a circuit diagram thereof.

FIG. 3 is a projected perspective view showing the top and bottom surfaces of a ceramic waveguide filter for an antenna according to an embodiment of the present disclosure, FIG. 4 is a projected plan view showing the one surface and the other surface of the housing of FIG. 3, FIG. 5 is a cross-sectional view showing the notch structure bar of the configuration shown in FIG. 3, FIG. 6 is a perspective view of FIG. 5, and FIG. 7 shows a graph representing the frequency characteristics of a ceramic waveguide filter for an antenna according to an embodiment of the present disclosure, and a circuit diagram thereof.

The ceramic waveguide filter 100*a* for an antenna according to an embodiment of the present disclosure may include, as shown in FIGS. 3 to 7, a housing 110*a* including a plurality of resonance blocks which are prepared from a dielectric having a predetermined dielectric constant, and some of which are partitioned by an inner partition wall 131; a plurality of resonators, each resonator being caused to serve as a single resonator by a plurality of resonator posts 121 to 126 respectively provided in the plurality of resonance blocks included in the housing 110*a*; an input porthole 141 to which an input port (not shown) is connected to input a signal to any one of the plurality of resonators, and an output porthole 142 to which an output port (not shown) is connected to output a signal from any one of the plurality of resonators.

Here, either the input porthole 141 or the output porthole 142 may be provided with a notch structure bar 141*a* integrally processed and formed in the housing 110*a*, which extends towards a resonator post (e.g., a second resonator post designated with reference number 122 (adjacent post)) skipping from the most adjacent resonator post (e.g., a first resonator post designated with reference number 121 (corresponding post)) among the plurality of resonator posts 121 to 126. The ceramic waveguide filter 100*a* for an antenna according to an embodiment of the present disclosure will be described under the assumption that the notch structure bar 141*a* extends only from the input porthole 141.

The notch structure bar 141*a* is formed to extend from the input porthole 141, so that it can implement a signal coupling (C-coupling or L-coupling) between itself and the second resonator post 122 skipping from the first resonator post 121, as shown in FIG. 7, at a time of the signal input step.

Here, the input porthole 141 or the output porthole 142 may be formed on the other surface of the housing 110*a* corresponding to an opposite surface to one surface on which the plurality of resonator posts 121 to 126 are formed, and the notch structure bar 141*a* may be formed to extend in the horizontal direction.

More specifically, as shown in FIG. 3, the notch structure bar 141*a* may be formed to extend in the horizontal direction and horizontally parallel to the bottom surface of the resonator post (i.e., the second resonator post (adjacent post), 122).

Here, the notch structure bar 141*a* may be formed through a cutting process in a groove shape on the opposite surface to the one surface of the housing 110*a* on which the plurality of resonator posts 121 to 126 are formed, and, in particular, the notch structure bar may be formed through a cutting process shallower than the depth of the input porthole 141 or the output porthole 142.

Additionally, in the ceramic waveguide filter 100*a* for an antenna according to an embodiment of the present disclosure, as shown in FIGS. 3 to 6, a notch partition groove 141*b* may be further processed and formed from the front end of the notch structure bar 141*a* to a depth greater than that of the input porthole 141 or the output porthole 142.

The notch partition groove 141*b* may be formed to be closer to the lower surface (i.e., bottom surface) of the second resonator post (adjacent post) 122 than the front end of the notch structure bar 141*a*, and when this notch partition groove 141*b* is provided, C-coupling can be implemented between the input porthole 141 and the second resonator post 122, and as shown in FIG. 7, a C-notch can be formed on the left end of the passband.

Here, the notch partition groove 141*b* performs a function of making the depth of the front end of the notch structure bar 141*a* relatively different, and when the depth of the front end of the notch structure bar 141*a* is formed relatively deeper as shown in FIGS. 3 to 6, the relative separation distance between the notch partition groove 141*b* and the second resonator post (adjacent post 122) is small, thereby enabling the implementation of the C-coupling with which the aforementioned C-notch is formed.

Conversely, in the case of a ceramic waveguide filter 100*b* for an antenna to be described below according to another embodiment of the present disclosure, which is not provided with the notch partition groove 141*b*, the relative separation distance between the front end of the notch structure bar 141*b* and the second resonator post (adjacent post, 122) is relatively large, and thus L-coupling for forming an L-notch rather than a C-notch can be implemented.

Here, the ceramic waveguide filter 100*a* for an antenna according to an embodiment of the present disclosure may be determined by whether the notch partition groove 141*b* is additionally formed in the notch structure bar 141*a* as a characteristic element distinguished from the ceramic waveguide filter 100*b* for an antenna according to another embodiment of the present disclosure described later.

Whether the notch partition groove 141*b* is additionally formed (i.e., implemented in one embodiment or another embodiment) becomes an important factor in determining the length to have either inductance or capacitance electrical characteristics by changing the physical separation distance from the input porthole 141 to the second resonator post 122 (adjacent post).

More specifically, in the case of the ceramic waveguide filter 100*a* for an antenna according to an embodiment of the present disclosure including the notch partition groove 141*b*, an electric-field (E-field) is physically formed between the notch partition groove and the second resonator posts 122 by the notch partition groove 141*b* located close to the second resonator post (adjacent post, 122), thereby enabling the implementation of the C-notch according to capacitive coupling on the left side of the passband.

Conversely, in the case of the ceramic waveguide filter 100*b* for an antenna according to another embodiment of the present disclosure, which is not provided with the notch partition groove 141*b*, since the front end of the notch structure bar 141*a* is relatively separated from the second resonator 122, a magnetic-field (H-field) is physically formed between the notch structure bar and the second resonator posts 122, thus enabling the implementation of the L-notch according to inductive coupling on the right side of the passband.

As described above, in the embodiments of the present disclosure, the kinds of the notches implemented on the left or right side of the passband may be different during frequency filtering depending on whether the notch partition groove 141*b* is present or not.

In order to facilitate the implementation of the cross coupling as described above, it is preferable that at least the front end of the notch structure bar 141*a* or the notch partition groove 141*b* is formed to have a length extending toward the second resonator post (adjacent post) 122 further beyond the outer partition wall 132 which is formed to partition the first resonance block with the first resonator post 121 (corresponding post) and the second resonance block with the second resonator post 122 (adjacent post) from each other. This is why, if the front end of the notch structure bar 141*a* or the notch partition groove 141*b* is further spaced from the second resonator post (adjacent post, 122) than the outer partition wall 132 (that is, when the length extending from the first resonator post 121 (corresponding post) does not exceed the outer partition wall 132), it is not easy to implement the cross coupling through a window from which the outer partition wall 132 is removed.

Meanwhile, on the notch structure bar 141*a*, and the input porthole 141 or the output porthole 142, coating portions may be formed by coating a metal material through plating. This coating portion may be understood as the same concept as the coating portion formed over the entire outer surface of the housing 110*a*.

That is, the notch structure bar 141*a* and the notch partition groove 141*b* may have coating portions formed on all inner surfaces thereof in the same way as the metal material is coated through plating on the inner surfaces of where the resonator posts 121 to 126 are formed.

In this connection, the notch structure bar 141*a* and the notch partition groove 141*b* may be partitioned by the non-plated portion 143 in order to prevent an electrical short between the input porthole 141 or the output porthole 142 and the coating portion plated on the outer surface of the housing 110*a*. It suffices to understand the non-plated portion 143 as a concept used to collectively refer to portions that are not plated, unlike the coating portion.

By the non-plated portion 143 which is distinguished from the coating portion, it is also possible to separately design two notch characteristics that are short and open coupled between the second resonator post 122 and both the notch structure bar 141*a* and the notch partition groove 141*b*.

For example, as in the ceramic waveguide filter 100*a* for an antenna according to an embodiment of the present disclosure, it is possible to form the coating portion on the inner surfaces of the notch structure bar 141*a* and the notch partition groove 141*b*, but to form the non-plated portion 143 only on the periphery of the input porthole 141 to which the notch structure bar 141*a* is connected, and as in the ceramic waveguide filter 100*b* for an antenna according to another embodiment of the present disclosure, it is also possible to form the non-plated portion 143 to surround both the input porthole 141 and the notch structure bar 141*a*.

Figure 8:
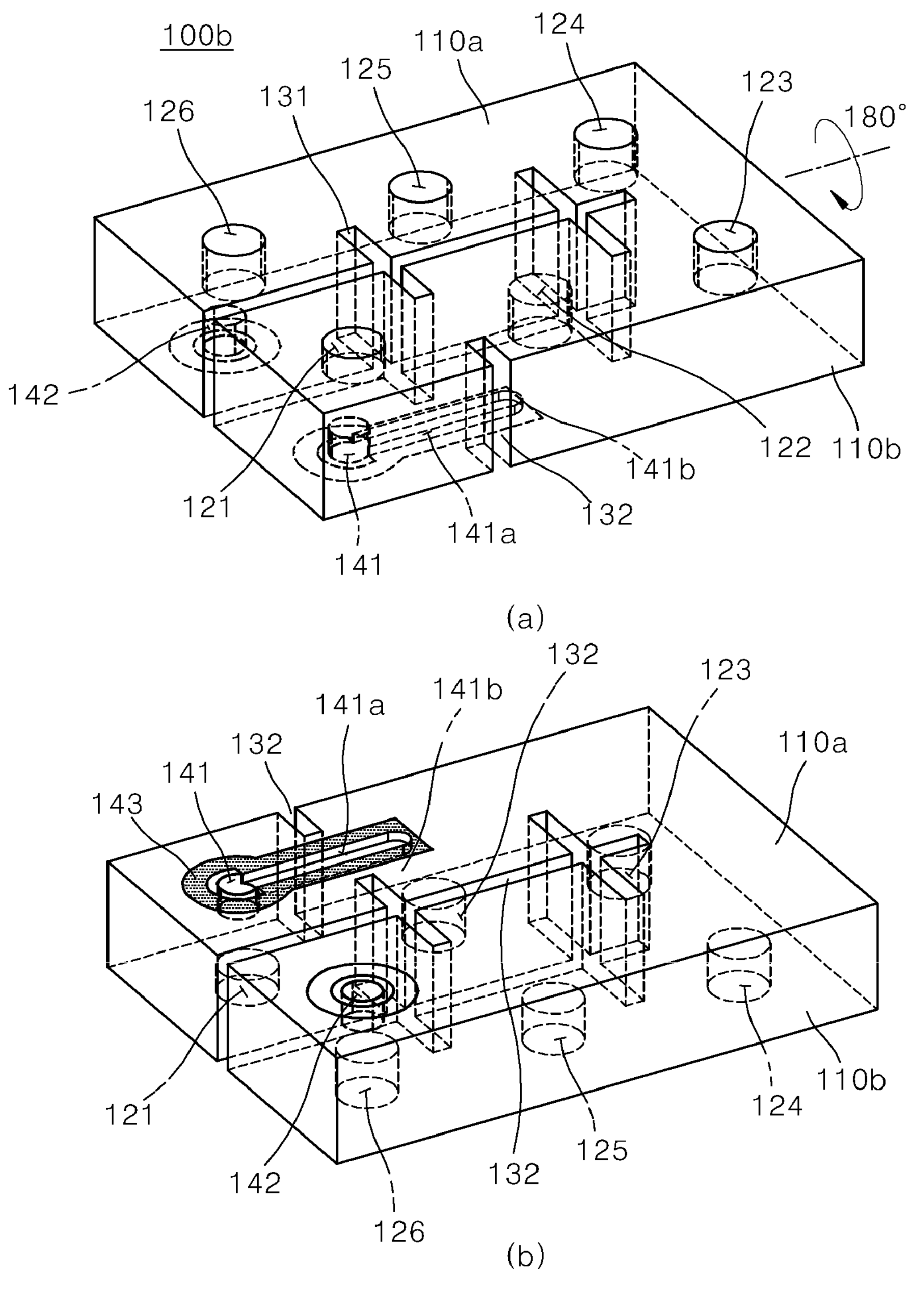
FIG. 8 is a projected perspective view showing the top and bottom surfaces of a ceramic waveguide filter for an antenna according to another embodiment of the present disclosure.
Figure 9:
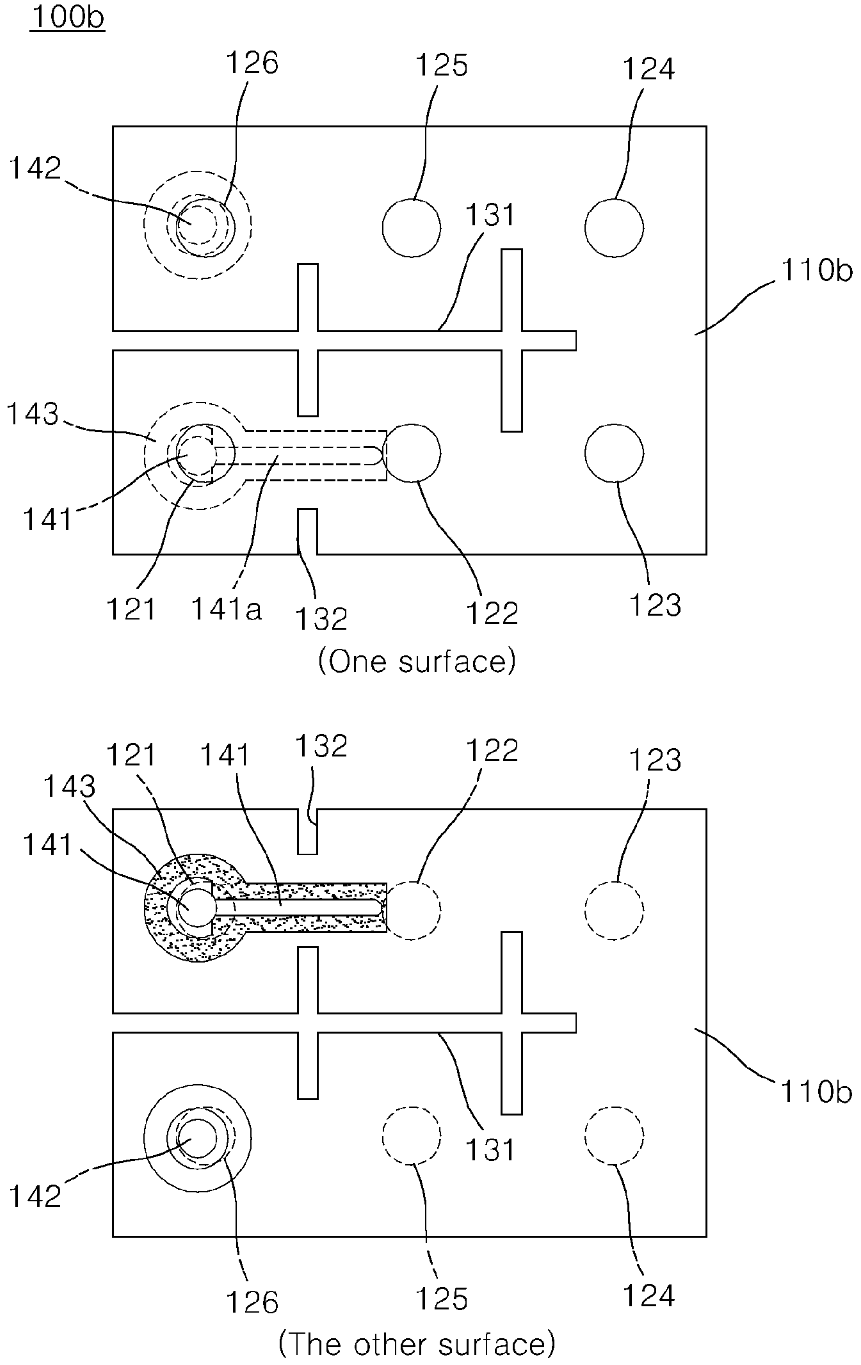
FIG. 9 is a projected plan view showing the one surface and the other surface of the housing of FIG. 8.
Figure 10:
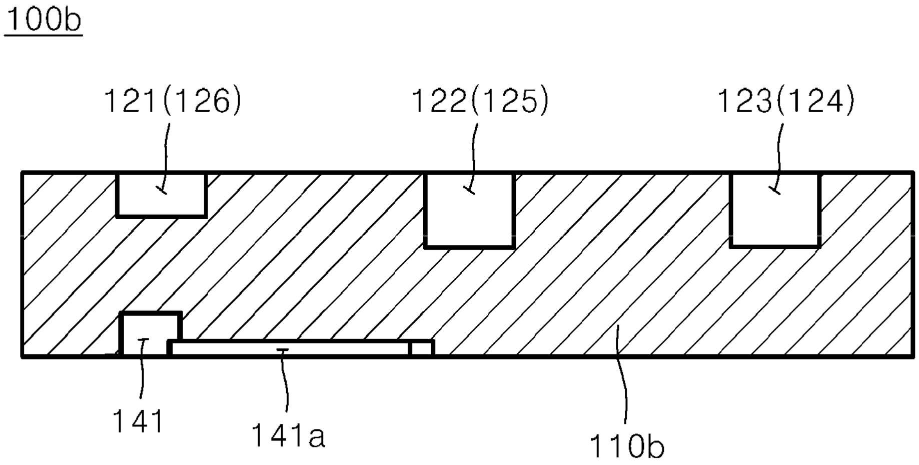
FIG. 10 is a cross-sectional view showing the notch structure bar of the configuration shown in FIG. 8.
Figure 11:
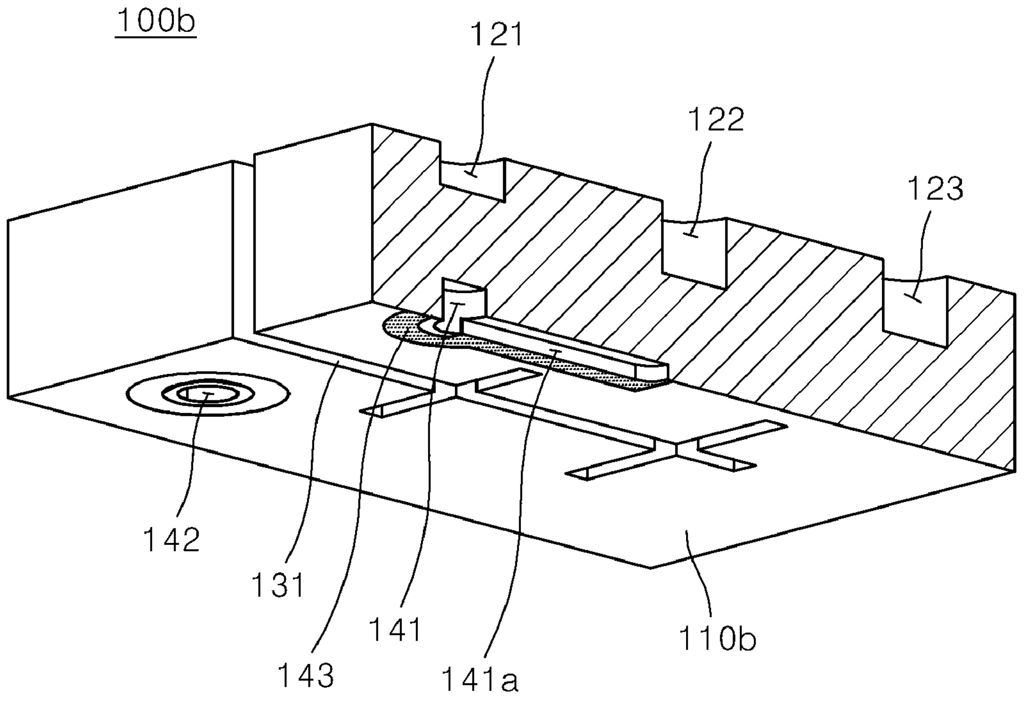
FIG. 11 is a perspective view of FIG. 10.
Figure 12:
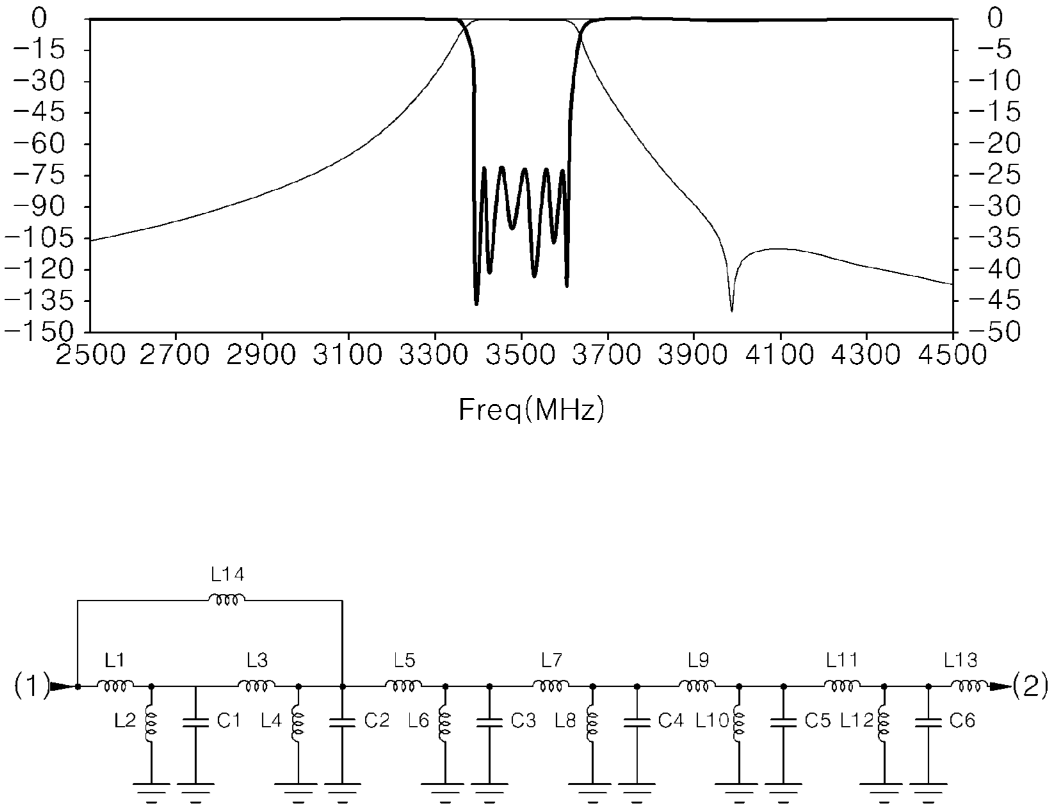
FIG. 12 shows a graph representing the frequency characteristics of a ceramic waveguide filter for an antenna according to another embodiment of the present disclosure, and a circuit diagram thereof.

FIG. 8 shows is a projected perspective view showing the top and bottom surfaces of a ceramic waveguide filter for an antenna according to another embodiment of the present disclosure, FIG. 9 is a projected plan view showing the one surface and the other surface of the housing of FIG. 8, FIG. 10 is a cross-sectional view showing the notch structure bar of the configuration shown in FIG. 8, FIG. 11 is a perspective view of FIG. 10, and FIG. 12 shows a graph representing the frequency characteristics of a ceramic waveguide filter for an antenna according to another embodiment of the present disclosure, and a circuit diagram thereof.

The ceramic waveguide filter 100*b* for an antenna according to another embodiment of the present disclosure, as shown in FIGS. 8 to 12, may be defined as an embodiment in which the notch partition groove 141*b* is not formed at the front end of the notch structure bar 141*a*.

That is, the ceramic waveguide filter 100*b* for an antenna according to another embodiment of the present disclosure, as shown in FIGS. 8 to 11, has a relatively greater distance between the front end of the structure bar 141*a* and the second resonator post 122 compared to the ceramic waveguide filter 100*a* for an antenna according to an embodiment of the present disclosure, by not forming the above-described notch partition groove 141*b* extending horizontally from either the input porthole 141 or the output porthole 142 and extending horizontally in parallel with the bottom surface of the second resonator post 122, which is an adjacent post.

In this connection, as described above, in order to facilitate the cross coupling between the front end of the notched structure bar 141*a* and the second resonator post 122, it is preferable that the front end of the notch structure bar 141*a* is formed to extend further toward the second resonator post 122 beyond the partition wall 132 formed to partition the first and second resonance blocks.

Meanwhile, in the ceramic waveguide filters 100*a* and 100*b* for an antenna according to one embodiment (see FIG. 5) and another embodiment (see FIG. 10) of the present disclosure as shown in FIGS. 5 and 10, the height of the entire frequency may be compensated according to the depth of the corresponding post, which is a resonator post formed on the one surface of the housing 110 associated with the resonance block corresponding to the input porthole 141 or the output porthole 142.

Particularly, in the case of the embodiments 100*a* and 100*b* of the present disclosure, as the structures of the notch structure bar 141*a* and the notch partition groove 141*b* are additionally formed in the housing 110, the overall frequency originally designed increases or decreases, and the frequency changed in this way can be complemented by adjusting the depth shape of the first resonator post 121 which is the corresponding post.

More specifically, when the depth of the first resonator post 121, which is a corresponding post, becomes relatively greater based on the depth of the second resonator post 122, which is the adjacent post, the complementation can be made so that the entire frequency is decreased by the depth difference between the first resonator post 121, which is the corresponding post, and the second resonator post 122, which is the adjacent post.

Conversely, when the depth of the first resonator post 121, which is a corresponding post, becomes relatively smaller based on the depth of the second resonator post 122, which is the adjacent post, the complementation can be made so that the entire frequency is increased by the depth difference between the first resonator post 121, which is the corresponding post, and the second resonator post 122, which is the adjacent post.

On the other hand, when the notch partition groove 141*b* is not formed at the front end of the notch structure bar 141*a*, as shown in FIG. 12, the frequency characteristics can be enhanced by an L-notch being formed on the right end of the passband according to the implementation of L-coupling between the input porthole 141 and the second resonator post 122.

As such, the embodiments 100*a* and 100*b* of the ceramic waveguide filter for an antenna according to the present disclosure provide following advantages: 1) Different couplings can be implemented depending on the notch partition groove 141*b* or the notch structure bar 141*a* extending from the input porthole 141 or the output porthole 142; 2) The structural designs of the resonator posts 121 to 126 can be simplified; and 3) Productivity and reliability of the product can be significantly improved since there is no need to insert an additional structure into the housing 110.

Even though all components constituting an embodiment of the present disclosure are described as operating together as a single entity, the present disclosure is not necessarily limited to such embodiment. Within the scope of the object of the present disclosure, depending on the embodiment, all components may be selectively combined in one or more ways to operate.

The above description is merely illustrative of the technical idea of the present disclosure, and various modifications and changes can be made by those of ordinary skill in the art to which the present disclosure pertains, without departing from the essential characteristics of the present disclosure.

INDUSTRIAL APPLICABILITY

The present disclosure provides a ceramic waveguide filter for an antenna in which characteristics of a specific passband are enhanced by applying a structure capable of the cross coupling to any one of an input porthole and an output porthole to which an input port and an output port are connected, respectively.

The invention claimed is:

1. A ceramic waveguide filter for an antenna comprising:

a housing including a plurality of resonance blocks which are prepared from a dielectric having a predetermined dielectric constant, and some of which are partitioned by an inner partition wall;

a plurality of resonators, each resonator being caused to serve as a single resonator by a plurality of resonator posts respectively provided in the plurality of resonance blocks included in the housing; and an input porthole to which an input port is connected to input a signal to any one of the plurality of resonators, and an output porthole to which an output port is connected to output a signal from any one of the plurality of resonators, wherein either the input porthole or the output porthole is provided with a notch structure bar integrally formed in the housing, which extends towards a resonator post skipping from an adjacent resonator post among the plurality of resonator posts, wherein the input porthole or the output porthole is formed on another surface of the housing opposite to one surface on which the plurality of resonator posts are formed, wherein the notch structure bar is formed to extend in a horizontal direction, and wherein the notch structure bar is formed through a cutting process in a groove shape on said another surface opposite to the one surface of the housing on which the plurality of resonator posts are formed, and the notch structure bar is formed through a cutting process shallower than the depth of the input porthole or the output porthole.

2. The ceramic waveguide filter for an antenna of claim 1, wherein the input porthole or the output porthole is formed on another surface of the housing opposite to one surface on which the plurality of resonator posts are formed, and wherein the notch structure bar is formed to extend in the horizontal direction and horizontally parallel to a bottom surface of the resonator post.

3. The ceramic waveguide filter for an antenna of claim 1, wherein a notch partition groove is further formed from the front end of the notch structure bar to a depth greater than the depth of the input porthole or the output porthole.

4. The ceramic waveguide filter for an antenna of claim 1, wherein on the notch structure bar and the input porthole or the output porthole, coating portions are formed by coating a metal material through plating.

5. The ceramic waveguide filter for an antenna of claim 1, wherein the notch structure bar is partitioned by a non-plated portion in order to prevent an electrical short between the input porthole or the output porthole and a coating portion coated on the outer surface of the housing through plating.

6. A ceramic waveguide filter for an antenna comprising:

a housing including a plurality of resonance blocks which are prepared from a dielectric having a predetermined dielectric constant, and some of which are partitioned by an inner partition wall;

a plurality of resonators, each resonator being caused to serve as a single resonator by a plurality of resonator posts respectively provided in the plurality of resonance blocks included in the housing; and an input porthole to which an input port is connected to input a signal to any one of the plurality of resonators, and an output porthole to which an output port is connected to output a signal from any one of the plurality of resonators, wherein either the input porthole or the output porthole is provided with a notch structure bar integrally formed in the housing, which extends towards a resonator post skipping from an adjacent resonator post among the plurality of resonator posts, wherein a portion between a resonator post formed on one surface of the housing associated with a resonance block corresponding to the input porthole or the output porthole with regard to which the notch structure bar is formed (hereinafter, referred to as "corresponding post") and a resonator post adjacent to the corresponding post (hereinafter, referred to as "adjacent post") is partitioned by the inner partition wall and by an outer partition wall formed on a side wall of the housing.

* * * * *